United States Patent
Beier

(10) Patent No.: US 8,696,266 B2
(45) Date of Patent: Apr. 15, 2014

(54) DEBURRING TOOL

(75) Inventor: Hans-Michael Beier, Atlandsberg (DE)

(73) Assignee: Beier Entgrattechnik, Altlandsberg (DE)

(*) Notice: Subject to any disclaimer, the term of this patent is extended or adjusted under 35 U.S.C. 154(b) by 1244 days.

(21) Appl. No.: 12/522,024

(22) PCT Filed: Nov. 21, 2007

(86) PCT No.: PCT/DE2007/002107
§ 371 (c)(1),
(2), (4) Date: Jul. 2, 2009

(87) PCT Pub. No.: WO2008/083646
PCT Pub. Date: Jul. 17, 2008

(65) Prior Publication Data
US 2010/0077895 A1 Apr. 1, 2010

(30) Foreign Application Priority Data

Jan. 8, 2007 (DE) .......................... 10 2007 001 245
Mar. 13, 2007 (DE) .......................... 10 2007 012 013
Apr. 28, 2007 (DE) .......................... 10 2007 020 207

(51) Int. Cl.
*B23B 51/00* (2006.01)
(52) U.S. Cl.
USPC .............. 408/57; 408/199; 408/147; 408/155
(58) Field of Classification Search
USPC ............. 408/57, 59, 147, 146, 154–156, 199, 408/223–224, 714; 407/33–34, 51, 53, 56; 82/1.11, 113; 409/139–140, 137
IPC .......................................... B23B 51/10,29/034
See application file for complete search history.

(56) References Cited

U.S. PATENT DOCUMENTS 3,442,162 A * 5/1969 Cogsdill ........................ 408/156
3,720,477 A * 3/1973 Rusin ............................ 408/226
(Continued)

FOREIGN PATENT DOCUMENTS

DE 3727103 A1 2/1989
DE 19712377 A1 11/1997
(Continued)

OTHER PUBLICATIONS

International Search Report from the European Patent Office dated May 13, 2008.
(Continued)

*Primary Examiner* — Daniel Howell
(74) *Attorney, Agent, or Firm* — Cohen & Hildebrand, PLLC

(57) ABSTRACT

The invention relates to a deburring tool for deburring abutting edges at orthogonally and obliquely extending transversal boreholes having a diameter of less than 10 mm in a component, such as an engine block, an injection system for combustion engines, a valve block and a camshaft or transmission shaft. The deburring tool is moved in a rotational and/or translatory manner and comprises a tool shaft (1), which is provided with a clamping end (2), and a tubular shaft part (5), characterized in that said tubular shaft part holds one or several cutting bodies (11) with a cutting blade (3), the cutting bodies being mounted in a movable manner in a passage (10), and in that a substance that is pressed under pressure into the through-bore (7) of the tool shaft (1) displaces the blade(s) to the exterior. The deburring tool is configured as a single piece and can be produced at low cost. Different blade geometries remove the burr by means of high speed deburring. The deburring tool can be introduced into the main borehole (HB) and the transversal borehole (QB). The technological requirements for the use of said deburring tool in intermittent assembly lines are therefore met.

25 Claims, 7 Drawing Sheets

(56) References Cited

U.S. PATENT DOCUMENTS

| | | | |
|---|---|---|---|
| 3,973,861 A * | 8/1976 | Sussmuth | 408/154 |
| 5,181,810 A * | 1/1993 | Heule | 408/147 |
| 5,755,538 A * | 5/1998 | Heule | 408/154 |
| 6,340,275 B1 | 1/2002 | Amaike et al. | |
| 7,273,334 B2 | 9/2007 | Heule | |
| 7,445,410 B2 * | 11/2008 | Abramson et al. | 408/154 |
| 7,507,057 B2 | 3/2009 | Beier | |
| 7,524,149 B2 * | 4/2009 | Heule et al. | 408/173 |
| 2005/0220550 A1 | 10/2005 | Beier | |
| 2006/0140732 A1 | 6/2006 | Hecht et al. | |
| 2006/0291967 A1 | 12/2006 | Heule | |

FOREIGN PATENT DOCUMENTS

| | | |
|---|---|---|
| DE | 10000239 A1 | 7/2000 |
| DE | 10215004 B4 | 10/2003 |
| DE | 102004054989 A1 | 5/2006 |
| EP | 1579937 A2 | 9/2005 |
| JP | 02172612 A * | 7/1990 |
| JP | 08141806 A * | 6/1996 |
| JP | 11309608 A * | 11/1999 |
| JP | 11320229 A * | 11/1999 |
| WO | 03084702 A1 | 10/2003 |
| WO | 2005/000509 A1 | 1/2005 |

OTHER PUBLICATIONS

International Search Report for PCT/DE2007/002107, mailed Mar. 10, 2009.

* cited by examiner

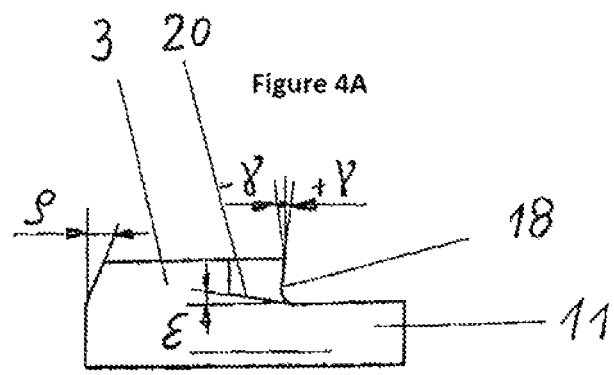
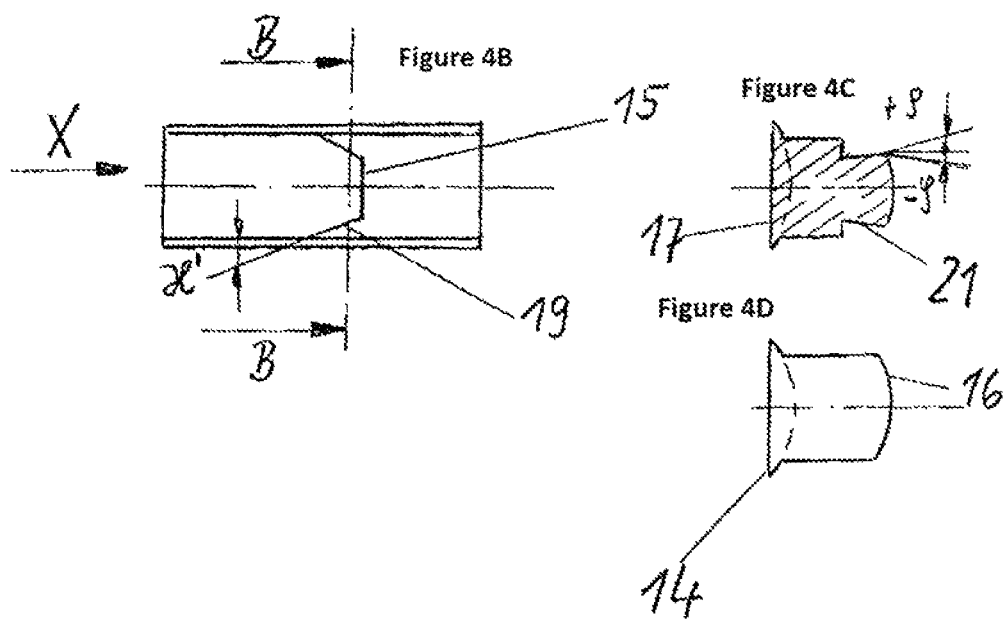

Figure 8
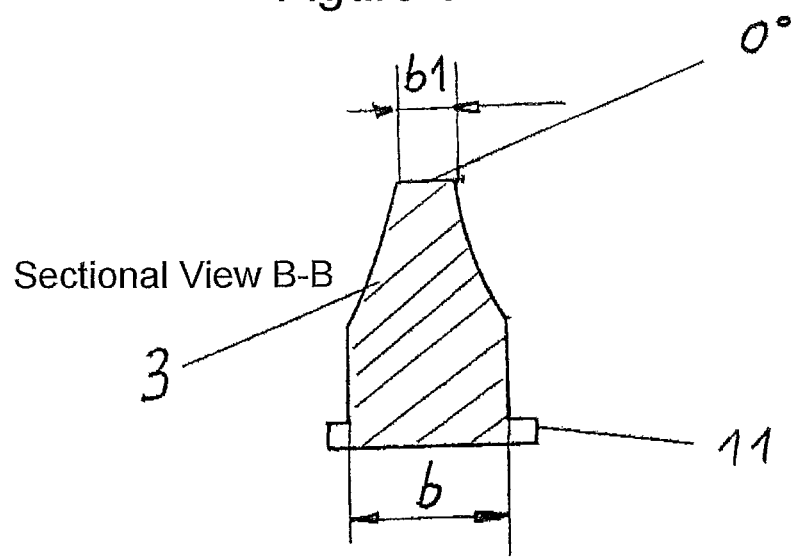
Sectional View B-B
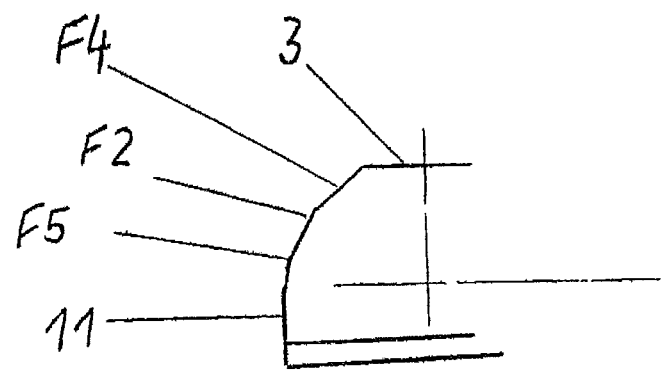
Figure 9

DEBURRING TOOL

This is an application filed under 35 USC §371 of PCT/DE2007/002107, claiming priority to DE 10 2007 001 245.6, filed on Jan. 8, 2007; DE 10 2007 012 013.5, filed on Mar. 13, 2007; DE 10 2007 020 207.7 filed on Apr. 28, 2007.

BACKGROUND OF THE INVENTION

The invention relates to a deburring tool for deburring abutting edges at orthogonally and obliquely extending transversal boreholes having a diameter of less than 10 mm in a component, such as an engine block, an injection system for combustion engines, a valve block as well as a camshaft or transmission shaft. When in use, the deburring tool is moved in a rotational and/or translatory manner, consists of a tool shaft comprising a clamping end and a tubular shaft part, which holds one or several cutting bodies, with a cutting blade, the cutting bodies, being mounted in each case in a movable manner in a passage and a substance, which is pressed under pressure into the through-borehole of the tool shaft, displaces the cutting blades(s) to the exterior.

A deburring tool, which can be used in a similar manner, is already known from DE 102 15 004 B4. It is characterizing for this deburring tool that it consists of a tool shaft, which has a clamping end with a material connection and of a shaft end at the tool side comprising a support body, which is arranged as a fixed journal, and of a tubular shaft part, which is connected to the tool shaft by means of connecting elements. The shaft part has one or several cutting bodies, which are in each case mounted in a movable manner in a passage and which loosely and with play bear on the surface of the support body, the shape and measurements of which are always geometrically different from the surface of the cutting body and a substance, which is pressed under pressure into the through-borehole of the tool shaft displaces the cutting blade(s) to the exterior. In particular because of the necessary connecting elements, the constructional embodiment of this deburring tool requires a high production effort, whereby an economical deburring processing for automated process sequences, such as, e.g., in intermittent assembly lines, is not given. However, the deburring tool is easy to handle and enables a technically safe deburring according to the required quality standard. This means that the cutting blade(s) do not create visible tracks at the wall of the borehole when the deburring tool is introduced the borehole. Abutting edges at intersecting boreholes of a workpiece can be deburred, for example, in that a pressure p of 0.3 MPa is programmed at the machine tool control and the deburring tool is then introduced into the borehole. The cutting blades located on the exterior of the tool shaft are thus moved to the interior, partial areas of the passage become free and the liquid or gaseous substance pressed into the through-borehole of the deburring tool can then flow off. When the cutting blade is introduced into the transversal borehole, the cutting blade moves to the exterior because of the applied pressure, which is generated by means of the available surface difference between support body and cutting body. A defined force, which can be used for the deburring, is now connected. The cutting blade forces of the deburring tool can be variably adjusted via the machine tool control by changing the pressure and can also be adapted to the different substances, which are to be deburred. The cutting blade arranged at the cutting body has a cutting blade height of less than 1 mm and a cutting blade width of less than 0.5 mm. The cutting blade encompasses shoulders, which are arranged laterally and which are provided with a shoulder angle of from 5 to 45 degrees. The cutting blade can thus be used, in particular, for deburring transversal boreholes having smaller diameters. An accurate cutting blade guide is to be given when the cutting body has a cutting blade center part with the cutting blade and a radial lateral cutting blade limitation. It is furthermore characterizing for the cutting blade that the actively cutting partial area encompasses a chamfer of 60 degrees, that the surfaces thereof are always arranged parallel to the x and y axis and have a clearance angle of zero degrees. This has the advantage that the deburring tool, after the deburring, removes the secondary bur, which may possibly be created, in response to the counter-clockwise rotation. It can be determined that non-constant engagement angles are given during the deburring at the actively cutting partial area of the cutting blade and at the base profile of the burr. This can be identified when one or several tangents rest against a circle. The angle between tangent and circle changes constantly even if the actively cutting partial area of the cutting blade is embodied in the shape of a parabola, an ellipsis or a hyperbola. In certain areas of the already deburred burr profile, this can lead to unsatisfactory results, such as the creation of deposits or uneven material losses. In addition, the cutting blade is stressed in an impulsive manner. Another disadvantage of the deburring tool lies in the shoulders, which are laterally arranged at the cutting blade and which interfere with a deburring of obliquely extending transversal boreholes having smaller diameters. Tests on obliquely extending transversal boreholes, which have a crossing angle of less than 90 degrees, also prove that these tools can only be used conditionally to deburr abutting edges at transversal boreholes having a crossing angle of up to 75 degrees as a function of the characteristic material values. High-strength materials are preferentially used specifically for components of the automotive industry. However, the deburring tool known from DE 102 15 004 B4 cannot remove this burr according to quality standards due to its cutting blade geometry. As is known, this burr is preferentially still removed manually with great effort. Mechanically operating tools for deburring the edge of the borehole of boreholes and transversal boreholes are known as well. Depending on the crossing angle, the mechanically operating tools deburr the ellipsis located in the space in an area of from 270 degrees to 320 degrees. The remaining area of from 40 degrees to 90 degrees is not deburred. This is the area, which has an edge angle of <90 degrees. The cause for this is the fact that a large pressure angle is created between cutting blade and edge angle of the ellipsis in the area of the small edge angles. When introducing the tool into the borehole, the burr is either pushed away or a new burr in the form of a secondary burr is produced in response to the deburring. Furthermore, a deburring tool for deburring small borehole diameters, where at least one recess oriented obliquely to the longitudinal axis of the base body is arranged in a base body, is known from DE 10 2004 054 989 A1. At least one knife is arranged in said recess in longitudinal direction of the recess so as to be displaceable in a spring-loaded manner and a pressure spring is arranged in a longitudinal borehole of the base body. Said pressure spring applies itself to the one end of a control bolt, the other end of which engages with a control recess, which is arranged in the blade and which assigns a holding force to the knife in displacement direction. It is characterizing herein that the base body, at its front side, transitions into a guide sleeve having a smaller diameter for the purpose of deburring borehole diameters of <20 mm. A longitudinal borehole, which is embodied as a sliding guide, for guiding the bolt tip of the control bolt, which is located there so as to be displaceable, is arranged in said guide sleeve, wherein the base body and the guide sleeve can be connected to one another by means of a screw connection. The production costs of the deburring tool are lowered by using the arrangement of a replaceable guide sleeve having a varying diameter. It should thus also be possible to attain a diameter of the guide sleeve of 2 mm, for example, wherein the length of the guide sleeve is approximately 23 mm. However, such a miniaturized embodiment of the guide sleeve can only be realized in a functionally reliable manner by means of a great effort. In addition, the spring-loaded knife, which is arranged in a displaceable manner, creates tracks at the wall of the borehole in response to the deburring. A deburring tool illustrated in DE 37 27 103 C2 as well as a corresponding tool holder are to be capable of being used for deburring or also for chamfering obliquely extending transversal boreholes in turning workpieces, such as, for example, in valve slides, valve bushings, nozzles and the like. It is characterizing that the tool body comprising the deburring tool is activated by a machine tool spindle, which can only carry out a feed motion along the transversal borehole axis. A fixed axis arranged coaxially to the spindle axis supports a cam comprising a substantially elliptical cross section at the end at the tool side. For clamping the tool body, the spindle furthermore comprises a tool holder, which consists of a clamping area for clamping on the spindle and a tool fastening area, which holds the tool. The tool fastening area can be moved relative to the clamping area in the direction from the cutting edge to the longitudinal axis of the tool obliquely to the latter opposite to the effect of a spring device. In addition, a scanner, which is embodied in a rail-shaped manner, is fixedly arranged at the tool fastening area. Said scanner rests against the periphery of the cam under the effect of the spring device, whereby the springs (leaf springs) are prestressed, on the one hand, and the tool can easily be introduced into a transversal borehole of a workpiece, on the other hand. The deburring tool itself has a cam surface, which extends in a helical line to the clamping area and which ends at a plane surface of the tool. Where the upper end of the cam surface penetrates the plane surface, the deburring tool forms the cutting edge. This cam surface is to ensure that every cut in a plane, which includes the longitudinal axis of the tool and a tool diameter, leads to the same curvature, which corresponds to the cutting edge. So as to generate a clearance angle behind the cutting edge, the cam surface extends in a helical line and, from the cut perpendicular to the longitudinal axis of the tool for each point of the cutting edge, a part of a spiral, the radial distance of which from the longitudinal axis of the tool—starting at the cutting edge—decreases opposite to the direction of rotation of the tool. In the area of the introduction chamfer, that is, of the introduction cone, as well as in the area of the circular cylinder surface, the tool body has a clearance angle of zero degrees. In response to the introduction of the deburring tool into the workpiece borehole, the tool is thus to rub only on the borehole wall, in spite of the rotations. The proposed deburring tool can also be used to deburr obliquely extending transversal boreholes. However, a corresponding cutting edge geometry must be computed for this intended use, which then leads to a usable bezel. The disadvantages of the deburring tool known from DE 37 27 103 C2 comprising the corresponding tool holder are that the cutting edge of the tool is embodied in parts of an ellipsis and that constant engagement angles are thus also not given. The radial distance of the cutting edge is controlled by the axis of rotation of the tool by means of components in the form a cam comprising an elliptical cross section, a spring device and a scanner, the production of said components being extensive, and a deburring of the passage/abutting edges at the transversal boreholes, which are created by two circle cylindrical surfaces penetrating one another, is made possible only by means of an embodiment of the tool body, which is extensive in view of the construction thereof, and of its cutting edge. Furthermore, the clearance angle behind the cutting edge has the disadvantage that the secondary burr forming in response to the deburring of the transversal boreholes, cannot be removed by the deburring tool. This deburring tool can only be used to deburr abutting edges on transversal boreholes having a large diameter. Due to the constructional embodiment, a miniaturization of the deburring tool cannot be realized or can only be realized with enormous effort.

BRIEF SUMMARY OF THE INVENTION

It is thus the object of the invention to create a deburring tool for deburring abutting edges at orthogonally and obliquely extending transversal boreholes having a diameter of less than 10 mm in a component, such as an engine block, an injection system for combustion engines, a valve block as well as a camshaft and a transmission shaft, which can be manufactured in a more cost-efficient manner by means of a simpler, functionally reliable constructional embodiment, which deburrs the burr at the abutting edges of components made of high-quality materials and independent on the material characteristic values in the non-deburrable ellipsis area by means of a changed cutting blade geometry according to quality standards and which also removes the burr without impulse stresses to the cutting blade, in that the actively cutting partial area of the cutting blade on the cutting body always encompasses a constant pressure angle on the base burr profile during the deburring. To solve the object, the afore-mentioned deburring tool is further developed by means of the features of the independent claim 1. The features of the subclaims also specify advantageous developments and improvements of the deburring tool as claimed in the invention. Advantageously, this deburring tool, which is configured as a single part, can be produced with a small effort in a functionally reliable manner by means of the cutting blade journal, which can be introduced and which acts as support body, and by means of fewer parts. Furthermore, the changed cutting blade geometry in different embodiments has the advantages that the burr at orthogonally and obliquely extending transversal boreholes in components is completely removed within the briefest amount of time by means of a high-speed deburring. To deburr the abutting edges at the transversal boreholes, the deburring tool can be introduced into the main borehole as well as into the transversal borehole. The technological conditions for the use of this deburring tool are thus given in intermittent assembly lines.

BRIEF DESCRIPTION OF THE DRAWINGS

The invention is to be defined in more detail by means of exemplary embodiments. For this purpose, FIGS. 4A-4D: show a cutting blade operating backwards.

DETAILED DESCRIPTION OF THE INVENTION

Figure 1:
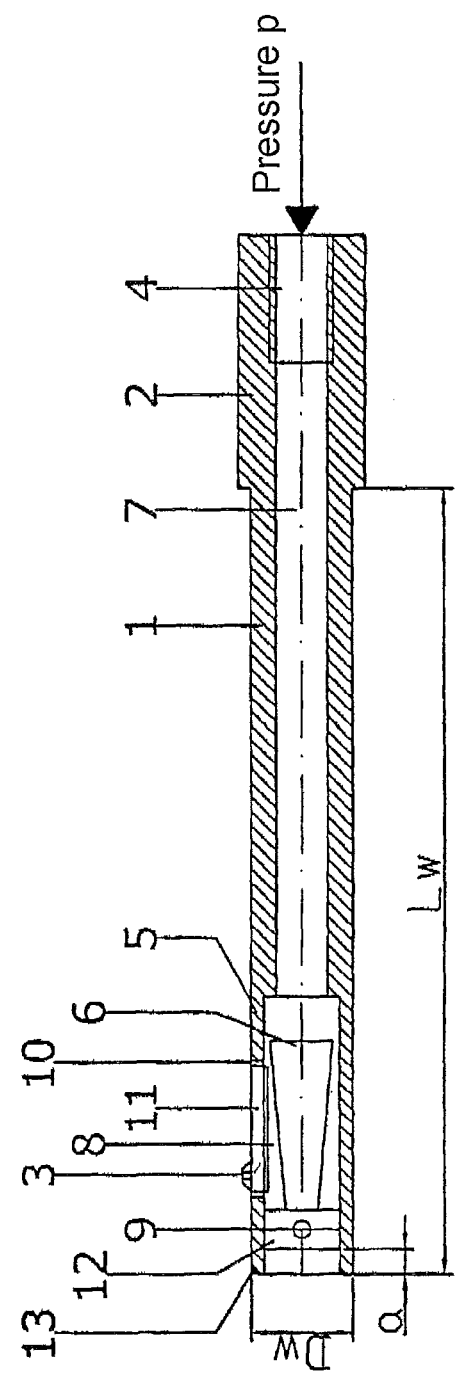
FIG. 1: shows the deburring tool according to the invention with a cutting blade in the side view in the sectional view.

FIG. 1 shows a preferred exemplary embodiment of the deburring tool according to the invention with a cutting blade in the side view in the sectional view. It is illustrated that the tool shaft 1 consists of a clamping end 2 comprising a material connection 4 and a shaft end, which is continued as a tubular shaft part 5. On its frontal end, the shaft part 5 has a pre-deburrer 13 and holds a cutting body 11 with a cutting blade 3, which is mounted in the passage 10 in a movable manner. As support body for the cutting body 11, a cutting blade journal 6 comprising a closing part 12 is pushed into the shaft part 5 until a dynamic pressure reduction measure a is set. This can be up to 1 mm, whereby the pressure ratios within and outside of the deburring tool are held constant. To secure the position, the cutting blade journal 6 is then fastened by means of a pin 9. The cutting body 11 loosely bears on the surface of the cutting blade journal 6 with a play 8. A through-borehole 7 and the material connection 4 guarantee the functional capability of the deburring tool, in which a substance, which is pressed under pressure into the through-bore 7, displaces the cutting body 11 comprising the cutting blade 3 to the exterior. The assembly of the deburring tool can be carried out in a simple manner. The cutting body 11 comprising the cutting blade 3 is placed into the passage 10 of the shaft part 5 from the front end. The cutting blade baring 6 comprising the closing part 12 can then be introduced into the shaft part 5 until the dynamic pressure reduction measure a has been reached and the cutting blade journal 6 is subsequently fastened by means of a pin 9 so as to maintain a stable position.

To deburr the abutting edge of the transversal borehole located in the hollow nozzle body of a suction nozzle for combustion engines, the deburring tool, for example, is introduced in clockwise rotation in a non-pressurized manner into the main borehole of the hollow nozzle body up to the transversal borehole. Damages to the wall of the borehole of the main borehole are thus avoided. The diameter of the main borehole of the hollow nozzle body is 3.6 mm and the transversal borehole located in the hollow nozzle body has a diameter of 1 mm. The boreholes are arranged at an edge angle of 90 degrees, thus orthogonally to one another. The suction nozzle has a hardness HRC >50. To generate an even burr body at the abutting edges of the transversal borehole, the pre-deburrer 13 initially removes the larger burr. This has the advantage that a deformation and bending, respectively, of the burr is avoided. A liquid substance, for example a bore emulsion is pressed under a pressure p of 0.6 MPa into the through-borehole 7, whereby the cutting body 11 comprising the cutting blade 3 moves to the exterior up to the wall of the borehole. The cutting blade 3 has a low pressure and the usable power for deburring is minimal. However, when the cutting blade 3 is introduced into the transversal borehole, said transversal borehole is extended by up to 0.7 mm. The pressure and the usable power for deburring are high. The cutting blade 3 acts on the base profile of the burr, which has the shape of an ellipsis and removes the burr of the partial area of the transversal borehole located opposite thereto. Finally, the deburring tool is removed in a counter-clockwise rotation and the other partial area of the transversal borehole is deburred.

For suction and injection nozzles having a main borehole diameter of greater than 5 mm and a transversal borehole diameter of less than 5 mm, an advantageous embodiment of the deburring tool is given when the ratio of effective tool length $L_W$ to effective tool diameter $D_W$>2.

Figure 2:
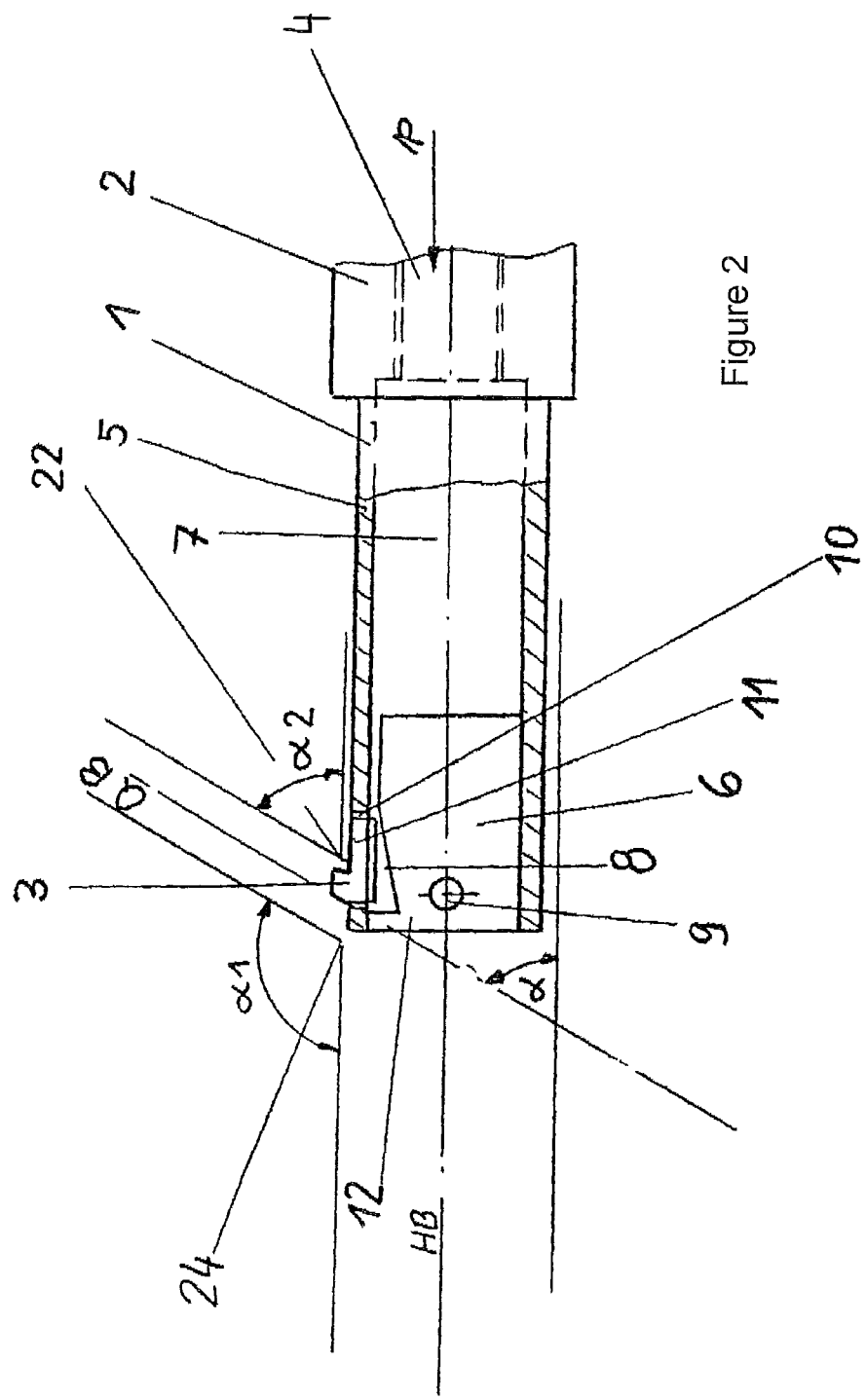
FIG. 2: shows the deburring tool according to the invention for deburring the abutting edge at intersecting boreholes comprising a crossing angle α of 60 degrees in a valve block in the side view in the sectional view.

FIG. 2 shows the deburring tool according to the invention for deburring the abutting edge at intersecting boreholes HB;QB having a crossing angle α of 60 degrees in a valve block in the side view in the sectional view. The edge angle α2 is also 60 degrees and the edge angle α1 has 120 degrees. The edge angles α1 and α2 are not constant at the entire periphery of the abutting edge 24. The deburring tool consists of a tool shaft 1, which has a clamping end 2 comprising a material connection 4 and a shaft end, which is a shaft end, which is continued as a tubular shaft part 5. The cutting blade journal 6 comprising a closing part 12, which can be introduced into the shaft piece 5, supports the cutting body 11 by means of an internal play 8. The position of the cutting blade journal 6 comprising the closing part 12 is secured with the shaft part 5 by means of a pin 9. A through-borehole 7 comprising the material connection 4 ensures that a liquid substance, such as a cutting oil, for example, which is pressed under pressure into the through-borehole 7, moves the cutting body 11, which is mounted in a movable manner in the passage 10 to the exterior by means of the backwards operating cutting blade 3.

For deburring, the deburring tool with its cutting blade 3 is moved in a translatory manner through the main borehole HB in a non-pressurized manner up to the abutting edge 24 behind the burr 22. A pressure is then applied for eight seconds under a pressure p of 0.015 MPa for generating a cutting blade power and is simultaneously moved back at a speed of 6 m/min either only in a translatory manner or by means of a clockwise or counter-clockwise rotation, whereby the burr 22 is broken off or separated at the abutting edge 24. For deburring the abutting edges at obliquely extending transversal boreholes in components of the automotive industry made of a high-strength substance, such as 42CrMo4, for example, the burr 22 is deformed when the deburring tool is moved backwards. A repeated introduction of the deburring tool or of a second deburring tool into the main borehole HB then eliminates said burr within the briefest amount of time according to quality standards. As a function of the technology of the component processing it is also possible to eliminate the burr from the abutting edge in an analogous manner by means of introducing the tool into the transversal borehole QB.

Figure 3:
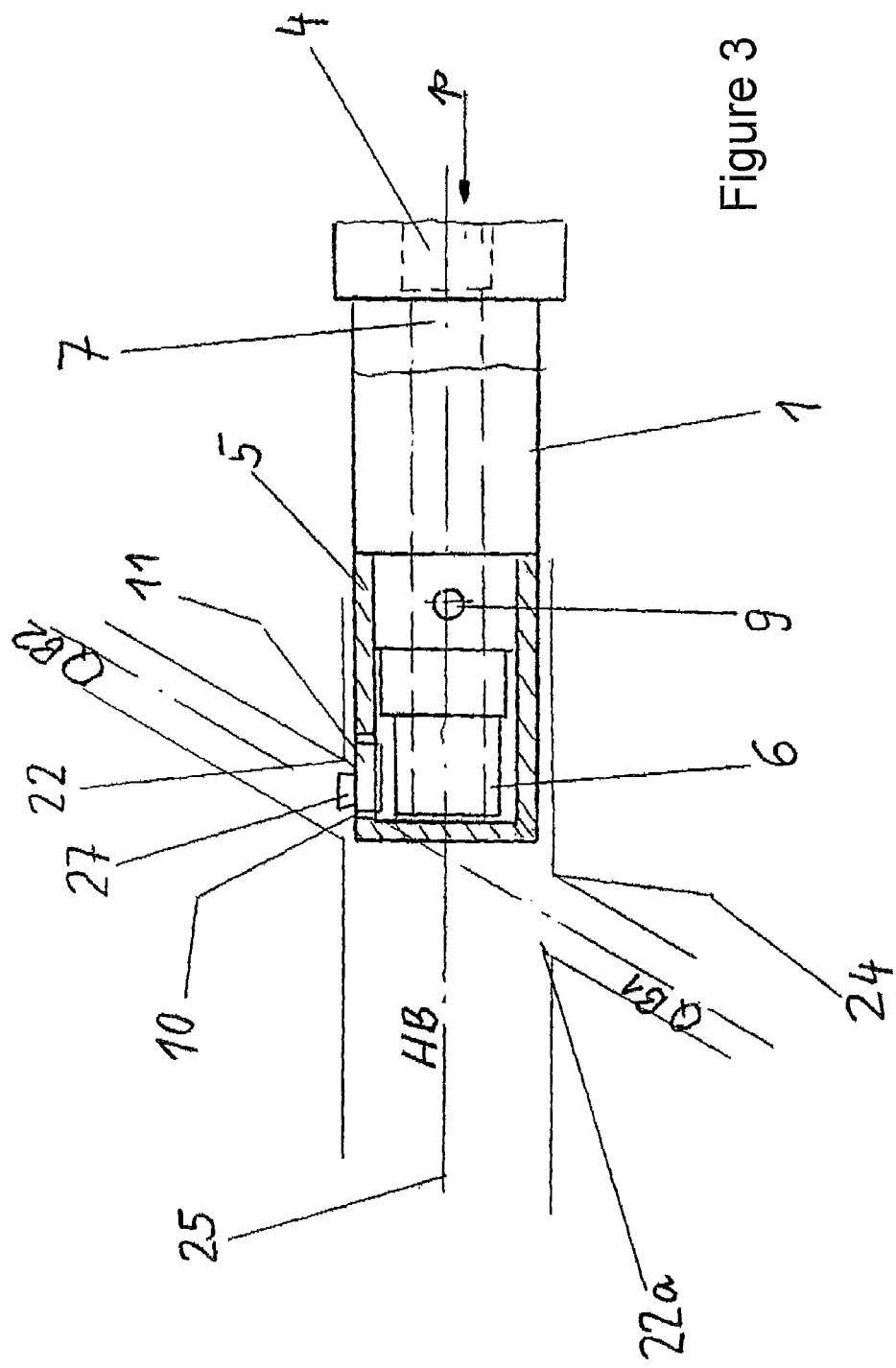
FIG. 3: shows a deburring tool for deburring the abutting edges at a double transversal borehole in the side view in the sectional view.

FIG. 3 shows a deburring tool for deburring the abutting edges at a double transversal borehole QB1; QB2 in the side view in the sectional view. As is known, it can be seen that the shaft end at the tool side comprises a support body 6, which is arranged as a fixed journal and is connected to the tool shaft 1 with a tubular shaft part 5 by means of a pin 9. A cutting body 11 comprising a cutting blade 27, which operates forwards and backwards and which is supported in the passage 10 in a movable manner, is arranged in the shaft part 5. The necessary cutting blade force is ensured by means of the material connection 4 and by means of the through-borehole 7, which is arranged centrically in the longitudinal axis 25 in that a liquid or gaseous substance or a substance consisting of a gas-liquid mixture is pressed under pressure into the through-borehole 7 and moves the cutting blade 27 to the exterior. It is also possible that at least two passages 10 comprising cutting bodies 11, which are supported in a movable manner, are arranged in the shaft part 5. Said at least two passages 10 have in each case a cutting blade 3, which operates backwards and a cutting blade 27, which operates forwards and backwards or which encompass at least two cutting blades 3, which operate backwards or at least two cutting blades 27, which operate forwards and backwards. The burr 22;22a at the abutting edges of the double transversal borehole QB1 and QB2, such as in a crankshaft for example, is deburred in that the deburring tool with its cutting blade 27 is moved in a fast motion vE in a translatory manner through the main borehole HB in a non-pressurized manner behind the abutting edge 24, a pressure p of 0.02 MPa is then applied to the deburring tool for 4 seconds and is simultaneously moved further at a speed vE—with or without a rotary motion—, whereby the burr 22a is deformed at the transversal borehole QB1. The non-pressurized deburring tool for deburring the abutting edge is then rotated by 180 degrees at the transversal borehole QB2 so as to be position-oriented and the method steps are carried out according to QB1. This means that the cutting blade 27 now stands directly at the burr 22, that a pressure of 0.02 MPa is then again applied to the deburring tool, that it is simultaneously moved back to the burr 22 with or without a rotary motion, whereby the burr 22 is deformed at the transversal borehole QB2 as well. To remove the burr 22;22a, it is necessary to introduce and remove the deburring tool or another tool into the main borehole HB again.

FIGS. 4A-4D show a cutting blade, which operates backwards, in the side (FIG. 4A) and top view (FIG. 4B) as well as in the sectional view B-B (FIG. 4C) and the base profile of the radial lateral cutting blade limitation 14 in the direction X (FIG. 4D). It is illustrated that the contour of the cutting blade 3 at the end of the cutting body 11 at the tool side is a chamfer, which is formed by an introduction angle $\zeta$ and that the contour at the end of the cutting body 11 at the tool side is a chamfer, which is formed by a chip space angle $\gamma$ comprising an effective cutting blade edge 15, which has a chip space 18 and a step chip breaker 20, which is determined by means of a chip guiding angle $\epsilon$, and that an undercut angle æ determines the shape of the cutting edge 19. The cutting blade 3 thus operates backwards. It is furthermore characterizing for the cutting blade 3, which operates backwards, that the introduction angle $\zeta$ is from 5 degrees to 15 degrees, the chip space angle $\gamma$ is from +20 degrees to −20 degrees, the chip guiding angle $\epsilon$ is greater than 0 degrees and the undercut angle æ is from 5 degrees to 30 degrees. The cutting blade upper side profile 16 should preferably be circular and the cutting blade lower side profile 17 should preferably be a line. The cutting blade side profile is a chamfer 21, which is defined by the side clearance angle $\phi$. The side clearance angle $\phi$ is from +10 degrees to −10 degrees.

Figure 5A:
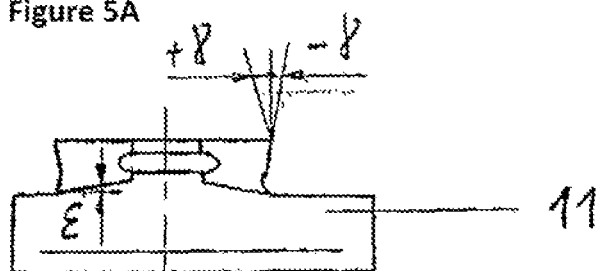
FIGS. 5A-5D: show a cutting blade operating forwards and backwards.
Figure 5B:
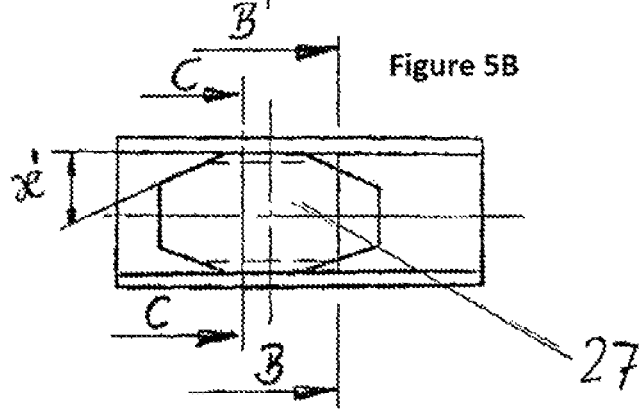
Figure 5C:
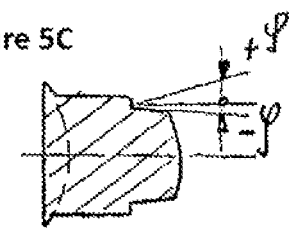
Figure 5D:
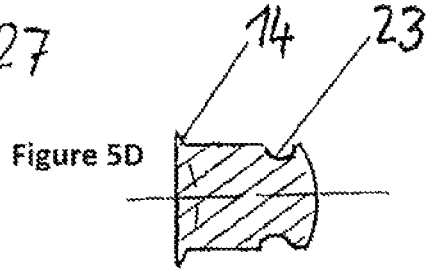

FIGS. 5A-5D show a cutting blade, which operates backwards and forwards, in the side (FIG. 5A) and top view (FIG. 5B) as well as in the sectional view (FIG. 5C) and the base profile of the radial lateral cutting blade limitation 14 in the sectional view C-C (FIG. 5D). It is illustrated that the cutting blade 3 according to FIGS. 4A-4D, which operated backwards and which is arranged at the end of the cutting body 11 at the tool side, is once again arranged at the end of the cutting body 11 at the tool side. This cutting blade can thus be used as a cutting blade 27, which operates forwards and backwards. A groove 23, which is arranged at the base profile of the radial lateral cutting blade limitation 14, makes it possible to deburr the remaining part of the ellipsis in a deburring manner after the deformation of the burr. This has the advantage that a repeated introduction of the deburring tool into the main borehole or into the transversal borehole is not necessary.

Figure 6:
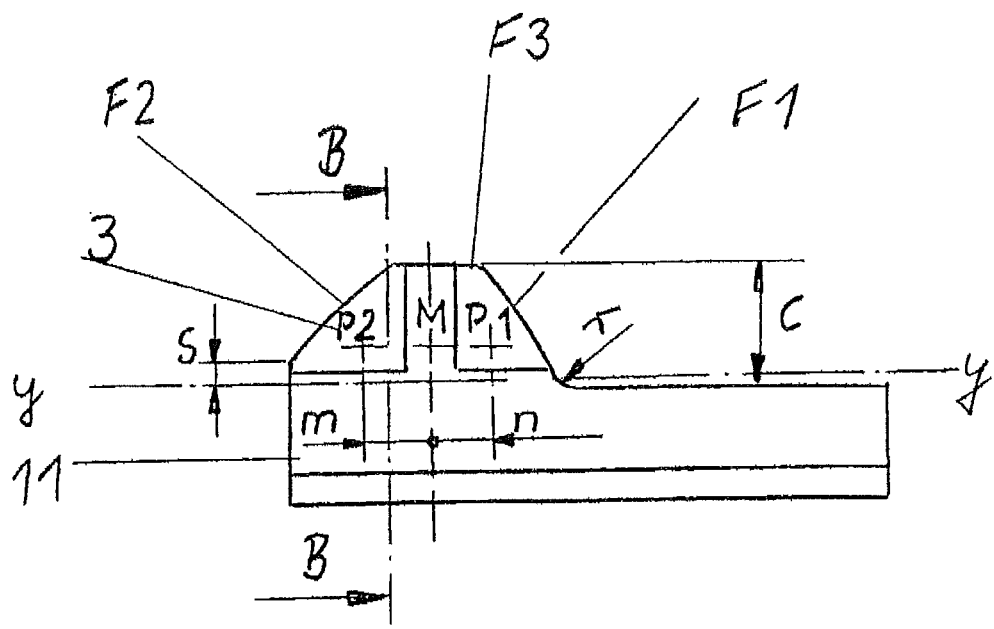
FIG. 6: shows a further embodiment of the cutting blade in the side view.

FIG. 6 shows a further embodiment of the cutting blade in the side view. It can be seen that the contour of the cutting blade 3 at the cutting body 11 is a cyclical cam surface F2 comprising a line s, which concludes to the cutting body 11, a planar surface F3, which extends parallel at a distance c to the cutting body 11, and a further cyclical cam surface F1 comprising a sector r, which concludes to the cutting body 11. Tests have shown that an embodiment of the cyclical cam surfaces F2; F1 as logarithmic spirals can be realized in a cost-efficient manner in practice. The production effort can be further lowered when the cyclical cam surfaces F2; F1 are embodied so as to be identical. The length of the planar surface F3 is determined by the cutting blade height c as well as by the distances m; n. The construction points P1; P2 are determined by the center M of the cutting blade 3. The smaller the diameter of the transversal boreholes of the abutting edges, which are to be deburred, the smaller the length of the planar surface F3, which can, however, also approach zero.

Figure 7:
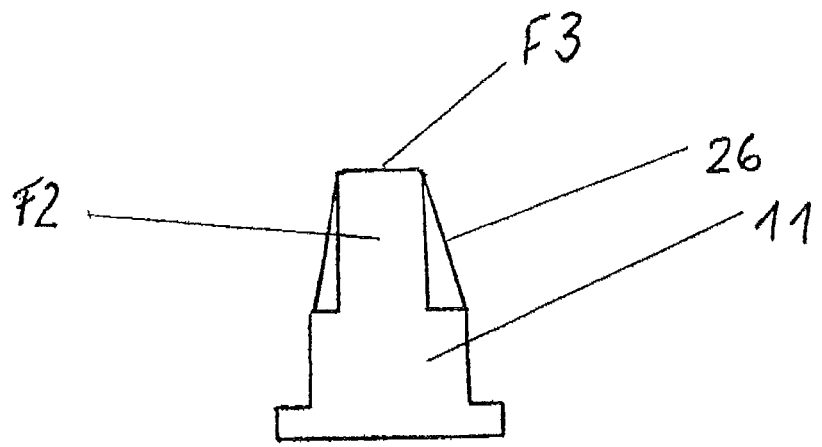
FIG. 7: shows the frontal cutting blade embodiment of FIG. 6, FIG. 8: shows the cutting blade embodiment in the sectional view B-B of FIG. 6 and FIG. 9: shows another embodiment of the cyclical cam surface F2.

FIG. 7 shows a frontal cutting blade embodiment of FIG. 6. It is illustrated that the limitations 26, which are laterally arranged at the cutting blade F2 at the cutting body 11, are embodied as a mirrored cyclical cam surface F2. This cutting blade embodiment thus enables the deburring of abutting edges at obliquely extending transversal boreholes. The changed constructive embodiment of the shoulders in the form of lateral limitations also ensures an improved accommodation of stresses. Impulsive stresses of the cutting blade are thus impossible or can be reduced considerably.

FIG. 8 shows the cutting blade embodiment in the sectional view B-B of FIG. 6. This cutting blade embodiment does not have any lateral limitations. The clearance angle is zero degrees. The cutting body 11 has a width b of ≤1 mm, preferably of ≤0.5 mm and the cutting blade 3 has a width b1 of ≤0.5 mm, preferably of ≤0.3 mm. The cutting blade 3 without lateral limitations makes it possible to deburr abutting edges at transversal boreholes comprising a diameter of less than 1.5 mm.

FIG. 9 shows another embodiment of the cyclical cam surface F2. It can be seen that the cyclical cam surface F2 of the cutting blade 3 at the cutting body 11 consists of two cyclical cam surfaces F4;F5 and that each cyclical cam surface has a different tangential angle. Abutting edges at transversal boreholes comprising a diameter of less than 1 mm can thus be deburred.

The invention claimed is:
1. A debarring tool for deburring abutting edges at orthogonally and
obliquely extending transversal boreholes having a diameter of less than 10 mm in
a component moved in a rotational and/or translatory manner when being used,
the deburring tool comprising:
a tool shaft (1) having a longitudinal axis, a lateral axis perpendicular to the longitudinal axis, a clamping end (2) and an opposite shaft end; the tool shaft (1) having a borehole (7) defined therethrough in a direction of the longitudinal axis;
a material connection (4) disposed on the clamping end (2) of the tool shaft (1);
a support body (6) disposed on the shaft end of the tool shaft (1) and arranged as a fixed cutting blade journal;
a tubular shaft part (5) connected to the tool shaft (1) and having at least one passage (10) defined therein;
a closing element (12) receivable into the tubular shaft part (5);
a connecting element (9) securing the cutting blade (3) by pinning the closing element (12) to the tubular shaft part (5); and at least one cutting body (11) moveably mountable in the at least one passage (10) of the tubular shaft part (5); the at least one cutting body (11) bearing loosely and with a play (8) on a surface of the support body (6); wherein the surface of the support body (6) and a surface of the at least one cutting body (11) differ in shape and dimension; the at least one cutting body (11) including a cutting blade (3) with a clearance angle of 0degrees; the cutting blade (3) having a first end disposed proximate the shaft end of the tool shaft (1), an opposite second end disposed proximate the clamping end of the tool shaft (1) and shoulders formed by a plurality of surfaces (F1; F2; F3); wherein the plurality of surfaces (F1; F2; F3) comprise:

(i) a first surface (F1) disposed at the first end of the cutting blade (3) is defined by an introduction angle ζ relative the lateral axis of the tool shaft (1), wherein the introduction angle ζ is in a range from 5 degrees to 45 degrees;

(ii) a second surface (F2) disposed at the second end of the cutting blade (3) is defined by a chip space angle γ relative to the lateral axis of the tool shaft (1);

wherein the second surface (F2) forms an effective cutting blade edge (15) defined by a chip space (18) and a step chip breaker (20), wherein the step chip breaker (20) is defined by a chip guiding angle ϵ relative to the longitudinal axis of the tool shaft (1);

a cutting blade edge (19) is defined by an undercut angle æ relative to the longitudinal axis of the tool shaft (1);

wherein the cutting blade (3) is displaceable radially outward when a pressurized substance is introduced into the borehole (7) of the tool shaft (1).

2. The deburring tool according to claim 1, wherein the cutting blade (3) operates only backwards.

3. The deburring tool according to claim 1, wherein the cutting blade journal (6) produces a dynamic pressure reduction of up to 1 mm.

4. The deburring tool according to claim 1, wherein a ratio of a diameter of the tool shaft (1) to a length of the tool shall (1) is greater than 2.

5. The deburring tool according to claim 1, wherein the introduction angle ξ is from 5 degrees to 15 degrees.

6. The deburring tool according to claim 1, wherein the chip space angle γ is from +20 degrees to −20 degrees.

7. The deburring tool according to claim 1, wherein the chip guiding angle ϵ is greater than 0 degrees.

8. The debarring tool according to claim 1, wherein the undercut angle æ is from 5 degrees to 30 degrees.

9. The debarring tool according to claim 1, wherein the cutting blade (3) has a circular cutting blade upper side profile (16), a linear cutting blade lower side profile (17) and a chamfer (21) and a cutting blade side profile extending partially between the two profiles (16, 17) determined by a side clearance angle φ relative to the lateral axis of the tool shaft (1).

10. The deburring tool according to claim 8, wherein the side clearance angle φ is from +10 degrees to −10 degrees.

11. The debarring tool according to claim 1, wherein the cutting body (11) further comprises a cutting blade (27) operating forwards and backwards.

12. The deburring tool according to claim 10, wherein the cutting body (11) has a groove (23) defined therein at a base profile of a radial lateral cutting blade limitation (14).

13. The deburring tool according to claim 1, wherein the tubular shaft part (5) has two passages (10) and two cutting bodies (11) movably mountable within the respective passages (10); each of the cutting bodies (11) includes: (i) the cutting blade (3) that operates backwards and a cutting blade (27) operating forwards and backwards; (ii) at least two cutting blades (3) operating, backwards; or (iii) at least two cutting blades (27) operating forwards.

14. The debarring tool according to claim 1, wherein the cutting blade (3) has a contour, starting from its first end, defined by: a linear section starting from the cutting body (11), transitioning to a first cyclical cam surface, transitioning to a planar surface parallel to the longitudinal axis of the tool shaft (1), transitioning to a second cyclical cam surface that terminates at the cutting body (11).

15. The deburring tool according to claim 14, wherein the cyclical cam surfaces are logarithmic spirals.

16. The deburring tool according to claim 14, wherein the cyclical cam surfaces are identical.

17. The deburring tool according to claim 14, wherein the first cyclical cam surface comprises at least two cyclical cam surfaces (F4; F5), each having a different tangential angle.

18. The deburring tool according to claim 14, wherein the first cyclical cam surface comprises at least two cyclical cam surfaces (F4; F5), each having a different tangential angle.

19. The deburring tool according to claim 14, wherein a length of the planar surface is based on a diameter of a transversal borehole to be deburred.

20. The deburring tool according to claim 14, wherein a length of the planar surface approaches zero.

21. The deburring tool according to claim 14, wherein the cutting blade (3) further comprises laterally arranged limitations (26) disposed between the planar surface and the cutting body (11) are mirrored cyclical cam surfaces.

22. The deburring tool according to claim 14, wherein the cutting blade (3) does not have laterally arranged limitations (26) disposed between the planar surface and the cutting body (11).

23. The deburring tool according to claim 1, wherein the cutting body (11) has a width (b) of ≤1 mm and the cutting blade (3) has a width (b1) of ≤0.5 mm.

24. The deburring tool according to claim 1, wherein the cutting body (11) has a width of ≤0.5 mm and wherein the cutting blade (3) has a width (b1) of ≤0.3 mm.

25. The deburring tool according to claim 1, wherein the component is an engine block, an injection system for combustion engines, a valve block, a camshaft or a transmission shaft.

* * * * *